United States Patent [19]

Hornak

[11] Patent Number: 4,577,361

[45] Date of Patent: Mar. 25, 1986

[54] BRUSH TOOL

[75] Inventor: Leonard P. Hornak, North Huntingdon, Pa.

[73] Assignee: Westinghouse Electric Corp., Pittsburgh, Pa.

[21] Appl. No.: 617,851

[22] Filed: Jun. 6, 1984

[51] Int. Cl.⁴ ............................................. A46B 13/02
[52] U.S. Cl. .................... 15/21 R; 15/21 E; 51/165.79
[58] Field of Search ............... 15/21 R, 21 B, 21 C, 15/21 D, 21 E, 53 R, 87, 104.1 C, 21; 125/11 TP; 51/2 J, 2 H, 165.78, 165.79, 98 HE, 95 LH

[56] References Cited

U.S. PATENT DOCUMENTS 3,643,644  2/1972  Nadalini ..................... 125/11 PH
4,343,059  8/1982  Simpson ........................ 15/21 E Primary Examiner—Edward L. Roberts
Attorney, Agent, or Firm—L. A. DePaul

[57] ABSTRACT

The tool serves to brush the upper and lower counterbores and the channels which interconnect the counterbores in the lower flange of the lower guide tube of a nuclear reactor. The top entrance to the counterbores is partially obstructed by the wall of the guide tube which extends above the flange. The tool includes an upper brush and a lower brush mounted with their axes displaced laterally in opposite directions with reference to the common axis of the counterbores. The mounting is movable linearly and is pivotal about a horizontal axis and includes cam slots engaged by cam followers. When the mounting is moved in one direction (down typically) the upper brush is moved by the cam action into cleaning relationship with the upper counterbore. When the mounting is moved in the opposite direction (up), the lower brush is moved by the cam action into cleaning relationship with the lower counterbore and with the channel between counterbores.

12 Claims, 5 Drawing Figures

BRUSH TOOL

CROSS-REFERENCE TO RELATED APPLICATIONS

Application Ser. No. 576,645 filed Feb. 3, 1984 to John T. Land, Ronald J. Hopkins, and Jose M. Martinez for "Replacement Support Pin for Guide Tubes for Operating Plants" and assigned to Westinghouse Electric Corporation is incorporated herein by reference.

Application Ser. No. 617,857, filed concurrently herewith to Raymond M. Calfo, George P. Dailey and Raymond P. Castner for "Replacement of Split Pins in Guide Tubes", assigned to Westinghouse Electric Corporation (herein Calfo) is incorporated in this application by reference.

BACKGROUND OF THE INVENTION

Calfo relates to apparatus and a method for replacing the old split-pin assemblies of the guide tubes of a nuclear reactor with new split-pin assemblies. Split-pin assemblies are secured in the flange of the lower guide tube. Each split-pin is held by a nut which penetrates into an upper counterbore in the flange and is seated against the base of the counterbore. During torquing of the nut, the flange on the split pin is drawn into a lower counterbore in the flange of the guide tube and is seated against the top of this counterbore. The replacement is carried out in a robotic work station under a pool of water to prevent exposure of operating personnel to radioactivity. During the replacement operation, the old split-pin assembly is fragmented by metal machining disintegration and the fragments are removed. Following this operation it is necessary to clean the counterbores and the channel between the counterbores. It is an object of this invention to provide a brush tool uniquely suitable for accomplishing this object.

The task of providing an effective brush tool is complicated by the fact that the upper counterbore is not accessible directly from the top; i.e., to cleaning by a brush which is coaxial with the axis of the opening in the guide tube and is inserted in the upper counterbore by vertical movement downwardly. The entrance to the upper counterbore is partially obstructed by the wall of the guide tube which extends upwardly from its flange.

It is an object of this invention to overcome this drawback and to provide a brush tool which shall be capable of effectively cleaning the counterbores in the lower flange of the lower guide tube of a nuclear reactor notwithstanding the obstruction of the part of the tube which extends above the flange.

SUMMARY OF THE INVENTION

In the practice of this invention, the lower guide tube is mounted with its lower flange generally horizontally and with the upper counterbore partly exposed to be entered from above and with the lower counterbore accessible from the bottom. There is provided, in accordance with this invention, a brush tool having an upper brush and a lower brush. These brushes are mounted on a support which is moveable upwardly and downwardly by a hydraulic cylinder. The support is pivotally mounted so that is is not only linearly moveable upwardly or downwardly by action of the cylinder but is also capable of pivotal movement at right angles to the upward or downward movement. The support carries cam slots which are engaged by cam followers extending from a fixed structure.

The brushes are displaced horizontally with reference to each other and with reference to the common axis of the counterbore. They are moved in opposite directions by the interaction of the cam slots on the support and the cam followers. In the neutral or standby position of the support, the brushes straddle the flange of the lower guide tube with the upper brush displaced, outwardly of the common axis of the counterbores, outwardly of the wall of the guide tube extending from its flange and the lower brush displaced inwardly towards this wall. When the support is moved in one direction (down), the upper brush is moved inwardly toward the wall and downwardly into cleaning relationship with upper counterbore avoiding the obstruction of the guide tube wall and with the lower brush below the flange. When the support is moved in the opposite direction (up), the lower brush is moved outwardly of the wall and upwardly into cleaning relationship with the lower counterbore and also with the channel between counterbores while the upper brush is above the flange. The lower brush has an upper extension of a cross section which enables it to penetrate into the channel between the counterbores and to clean the walls of this channel.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DESCRIPTION OF THE PREFERRED EMBODIMENTS

Figure 1:
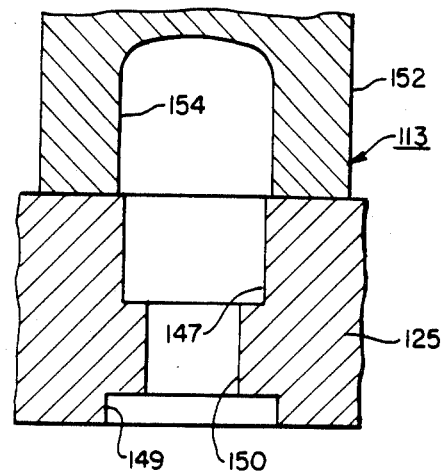
FIG. 1 is a fragmental view in side elevation, with the lower flange, partly sectioned, of a lower guide tube in the condition in which it is when it is to be cleaned.

FIG. 1 shows a lower guide tube 113 including a flange 125. On opposite sides spaced 180° apart the flange includes an upper counterbore 147 and a lower counterbore 149 (only one set shown). The counterbores are joined by a channel 150. The upper and lower counterbores 147 and 149 and the channel 150 are coaxial. The split-pin (not shown) is projected centrally through the lower counterbore 149 and is engaged by a nut (not shown) which is inserted in the upper counterbore. The nut is torqued onto the pin until the nut seats on, and locks to, the base of the upper counterbore 147. The nut is held down while it is being torqued and as it threads onto the split pin it draws the split-pin into the lower counterbore 149 until a flange on the pin engages the top of the lower counterbore 149. The wall 152 of the lower guide tube 113 which extends from the flange 125 is provided with a slot 154 to facilitate insertion of the nut. However, brushing of the upper counterbore 147 is partially obstructed by the wall 152 and precludes the direct insertion of a brush from above. The brush tool 215 according to this invention overcomes this drawback.

Figure 4:
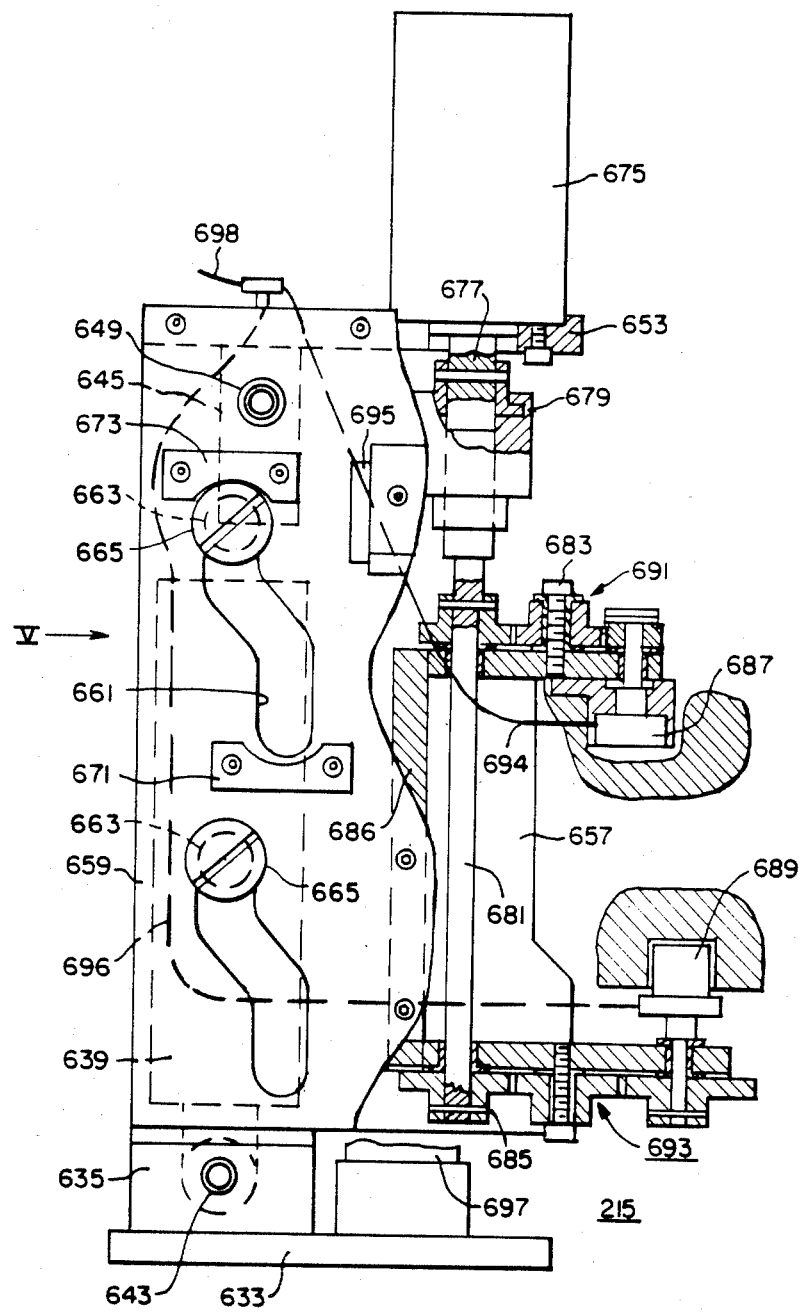
FIG. 4 is a view in side elevation taken in the direction IV of FIG. 3.
Figure 5:
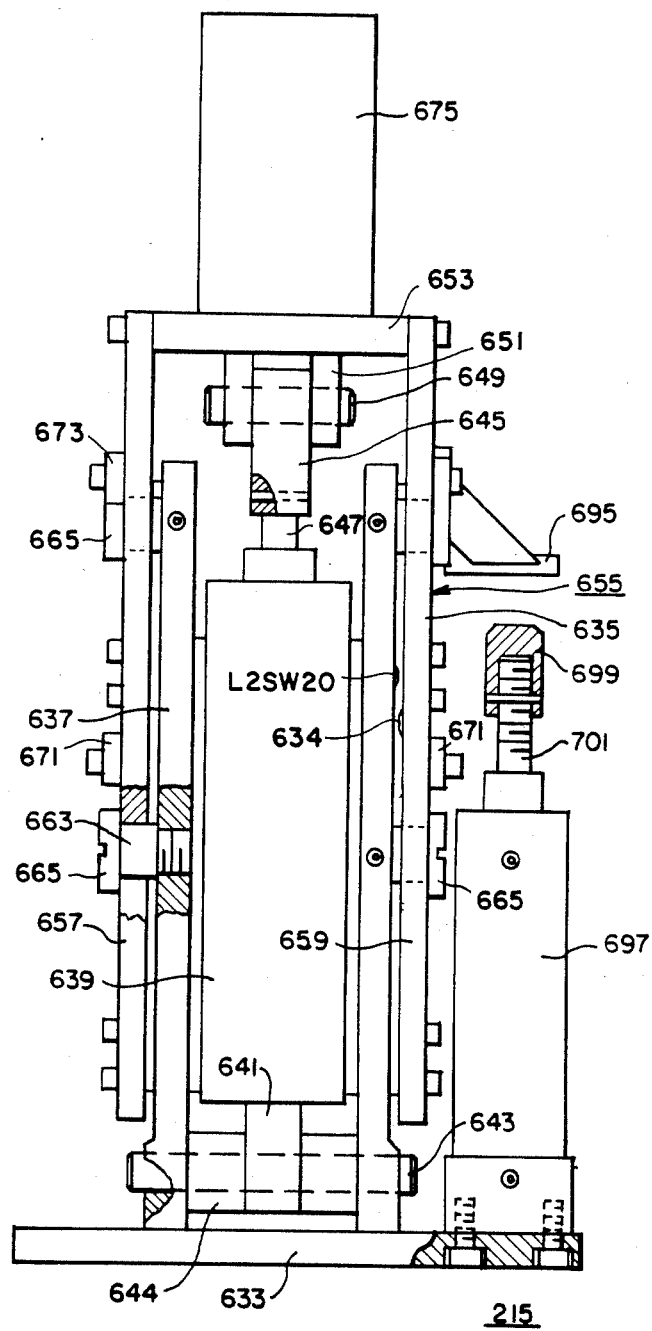
FIG. 5 is a view in end elevation taken in the direction V of FIG. 4.

The brush tool 215 includes a supporting plate 621 (FIG. 2) carried by cluster plate 216. Tracks 623 extend across the supporting plate 621 along which slides or pillows block 625 are moveable parallel to the tracks 623 by a transport cylinder 627. A plate 628 is mounted on the slides and it carries an angular support 629 braced by a triangular plate 631. A support base 633 is disposed on the horizontal member of the angular support 629. Vertical plates 635 (FIG. 5) and 637 are joined by welds to the base 633. At their bases the plates 635 and 637 are thickened. A lift cylinder 639 (FIGS. 4, 5) is pivotally supported, on a lug 641 extending from its base, on a pivot pin 643 extending between the thickened portions of the plates 635 and 637. The lug 641 is separated from the plates 635 and 637 by spacers 644. A rod eye 645 is pinned to the piston rod 647 of the cylinder 639. The rod eye is pivotally connected to a pivot pin 649 extending between lugs 651 welded to the top 653 of a housing 655 of generally U longitudinal cross-section. As the piston rod 647 moves upwardly or downwardly, it raises or lowers housing 655 vertically and at the same time permits the housing to pivot in a plane perpendicular to the pivot pin 649 (FIG. 5).

Figure 2:
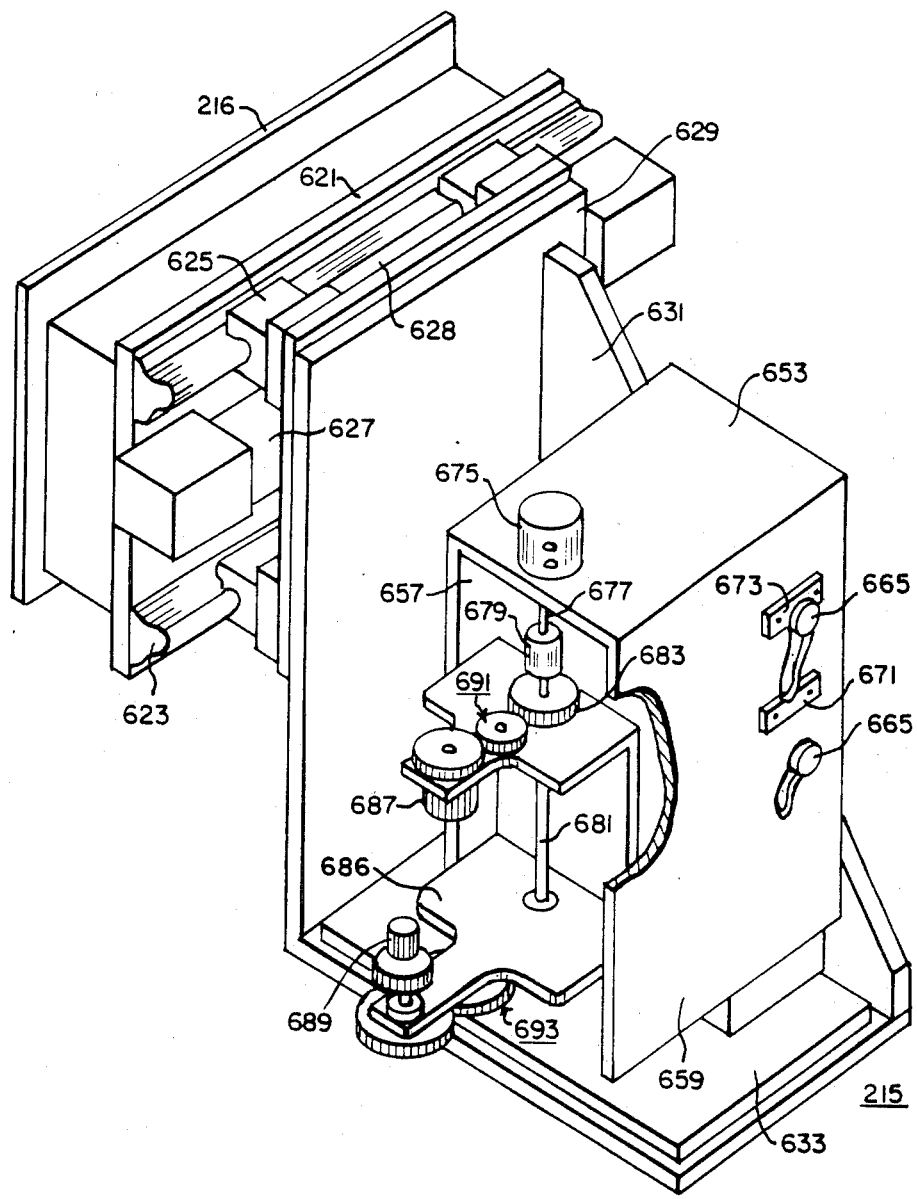
FIG. 2 is a view in perspective of a brush tool according to this invention with parts removed in the interest of clarity.

The side walls 657 and 659 of housing 655 are provided with parallel cam slots 661 of generally shallow S-shape as viewed along the vertical. There are four cam slots 661, two in each wall 657 and 659. The cam slots in each wall are parallel to each other and each pair of cam slots in opposite walls 657 and 659 are precisely aligned parallel to each other and at the same level. A guide screw or cam follower 663 is in engagement with each cam slot 661. Each cam follower 663 is threaded into the plate 635 or 637 behind the corresponding wall 657 or 659 of the housing 655 and doweled to the corresponding plate. The head 665 of each cam follower 663 slidingly engages the corresponding wall. The cam slots 661 move relative to the cam followers as the piston rod 647 moves upwardly or downwardly. By cooperation of the followers 663 and the cam slots 661, the housing 655 is moved laterally, parallel to walls 657 and 669 (FIGS. 2 and 4). In FIG. 4, the housing 655 is shown in its lowermost and extreme rightward position as viewed from FIG. 4 (rightward as viewed in FIG. 2 which is shown reversed with reference to FIG. 4). This housing is moved to this position when the piston rod 647 is in its most downward position. When the piston rod 647 is moved upwardly, the housing 655 moves upwardly and to the left as viewed from FIG. 4. Stops 671 and 673 are provided to limit the upward and downward movement of housing 655.

Figure 3:
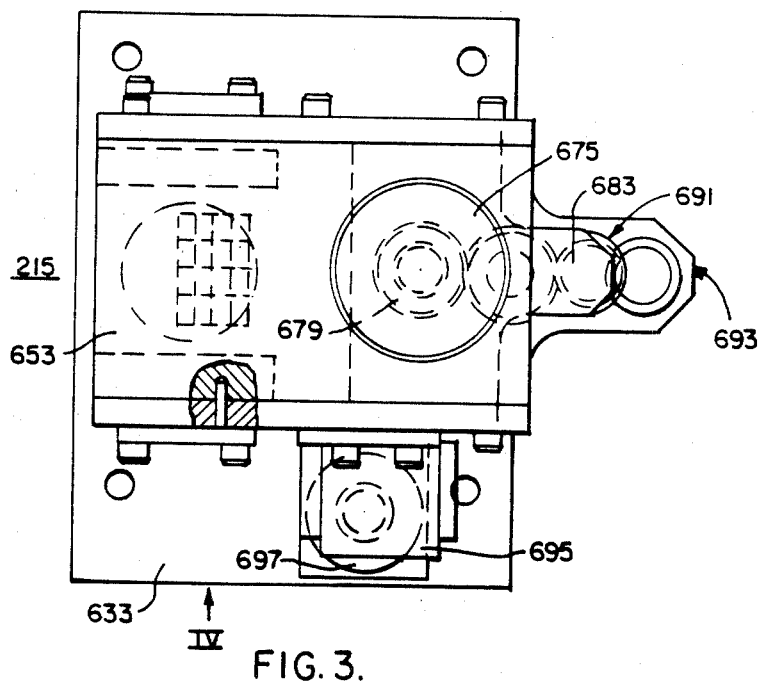
FIG. 3 is a plan view of the brush tool.

A hydraulic motor 675 (FIGS. 3, 4, 5) is mounted on the top 653 of the housing. The shaft 677 of this motor 675 is connected through a coupling 679 to a drive shaft 681. Drive gears 683 and 685 are dowelled to the drive shaft 681 above and below the horizontal members of a bracket 686 of generally C longitudinal cross section but with the lower member longer than the upper member. Each drive gear 683 and 685 drives a brush 687, 689 through a gear chain 691, 693. The upper brush 687 has a diameter equal to or slightly greater than the diameter of the upper counterbore 147 so that it can effectively clean this counterbore. The lower brush 689 is in two sections. An upper section having a diameter equal to or slightly greater than the channel 150 between the counterbores so that it can effectively clean this channel and a lower section of a diameter equal to or slightly greater than the diameter of the lower counterbore 149 so that it can effectively clean this counterbore. Water under pressure is supplied to both brushes by hoses 694 and 696 (FIG. 4) from a common hose 698 connected to a pump (not shown). The brushes 687 and 689 are offset. The offset is necessary because in raising the housing 655, the upper brush must be moved laterally inwardly to clear the top of the slot in the wall of the LGT113 which permits the nut to be inserted. It is necessary that the lower brush 689 be offset inwardly so that in the most upward position of the housing, it will be centered in the lowermost counterbore 149.

An angle stop bracket 695 (FIGS. 3, 4, 5) is mounted on wall 659 of housing 655. A cylinder 697 is mounted on base-plate 633 with the nose 699 connected to its piston rod 701 directly below the horizontal member of bracket 695. With the piston in the upper most position, the cam slots are positioned so that the cam followers 663 are in neutral position in the cam slots 661; i.e., centered on the diagonal parts of the slots with the brushes 685 and 687 straddling the flange 125. That the cam followers are in neutral position is signalled by proximity limit switch L2SW20 which is enabled by actuator 634 (FIG. 5) on housing 655. In this position of the cam brush 687 is above the flange 125 of the LGT113 and brush 689 is below the flange.

During stand-by, the nose 699 is raised by cylinder 697 so that bracket 695 and housing 655 are in the neutral position. To initiate a brushing operation, the first step is to energize the hydraulic motor. Next, cylinder 639 is actuated to raise housing 655. The housing 655 is moved leftward, as viewed in FIG. 4, and then raised so that brush 689 brushes counterbore 149 and channel 150 (FIG. 1). Cylinder 697 is next actuated to lower nose 699. With the housing 655 in the uppermost position brush 687 is in position to brush the upper counterbore 147 (FIG. 5). After the lower counterbore 149 is brushed, cylinder 639 is actuated to lower housing 655 and move it to the right. Brush 687 is now in position to brush upper counterbore 147 (FIG. 4). It is important to brush the lower counterbore 149 and channel 150 first because any debris which is injected into upper counterbore 147 by brushing channel 150 can be removed by brushing the upper counterbore last. After the brushing is complete, housing 655 is raised to the uppermost position by cylinder 639. Now cylinder 697 raises nose 699. Cylinder 639 is now exhausted until bracket 695 engages nose 699.

While a preferred embodiment of this invention has been disclosed herein, many modifications thereof are feasible. This invention is not to be restricted except insofar as is necessitated by the spirit of the prior art.

I claim:

1. A brush tool for cleaning the opening in the flange of a lower guide tube of a nuclear reactor in which the split-pin assembly is secured, during the replacement of old split-pin assemblies by new split-pin assemblies, said opening having a common longitudinal axis, the said brush tool comprising an upper brush and a lower brush, means mounting said upper and lower brushes in position to be moved into brushing relationship with the upper and lower parts of the opening, but with their axes displaced with reference to each other transversely to said common axis, cam means connected to said mounting means, when actuated, for displacing said upper brush so that it is in brushing relationship with the upper part of the opening and for displacing said lower brush so that it is in brushing relationship with the lower part of the opening, means, connected to said cam means, for actuating said cam means as aforesaid, and means, connected to said brushes for operating said brushes to clean said opening.

2. The tool of claim 1 wherein the flange is positioned for brushing generally horizontally and in the standby position of said tool, the upper brush is mounted by the mounting means above and with its axis displaced in one direction from the common axis and the lower brush is positioned by the mounting means below and with its axis displaced in the opposite direction with respect to the common axis, and the actuating means is actuable to move said upper brush in said opposite direction and downwardly into brushing relationship with the upper part of the opening and is also actuable to move said lower brush in said one direction and upwardly into cleaning relationship with the lower part of said opening.

3. The brush tool of claim 1 wherein the cam means is actuable by the actuating means to displace the upper brush into brushing engagement with the upper part of the opening and the lower brush into brushing engagement with the lower part of the opening in a selectable succession, the other brush being out of brushing engagement with its corresponding part when one brush is in engagement with its corresponding part.

4. The tool of claim 1 wherein the operating means includes a motor common to both brushes and a common shaft connected to said motor and to said brushes for driving said brushes to clean the upper and lower parts of the opening.

5. A brush tool comprising a support, a housing, means mounting said housing moveable with respect to said support, said housing having a wall, said wall having therein at least one cam slot, a cam follower rigidly connected to said support engaged with said cam slot, brush means connected to said housing, and means, connected to said housing, for moving said housing thereby to move said cam slot with respect to said cam follower to displace said housing in accordance with the shape of said cam slot and thereby to position said brush means for brushing.

6. The tool of claim 5 wherein the mounting means mounts the housing moveable linearly with respect to the support and also pivotal and wherein the cam slot is shaped to move the housing linearly and to pivot the housing in a predetermined selectable succession.

7. The tool of claim 5 wherein the housing has opposite walls in each of which there is a cam slot, said cam slots in the opposite walls being parallel and aligned, and a cam follower rigidly connected to the support engaged with each of the cam slots.

8. The tool of claim 5 wherein the support includes a pair of plates each plate extending along one of the walls and a cam follower extends from each plate into engagement with the cam slot in the wall along which the plate extends.

9. The tool of claim 8 wherein each plate is inwardly of the wall along which it extends.

10. The tool of claim 1 for use with a flange of a lower guide tube having an upper counterbore in the upper part of the opening and a lower counterbore in the lower part of the opening, said upper and lower counterbores being interconnected by a channel, the upper brush to clean the upper counterbore and the lower brush to clean the lower counterbore, wherein at least one of said brushes is shaped to clean the wall of the interconnecting channel.

11. The tool of claim 10 wherein the lower brush is shaped to clean the interconnecting channel.

12. The apparatus of claim 1 including means for setting the mounting means in a standby position in which the brushes straddle the flange.

* * * * *